United States Patent
Chaney

(10) Patent No.: US 7,548,619 B2
(45) Date of Patent: *Jun. 16, 2009

(54) SYSTEM AND METHOD FOR COPY PROTECTION FOR DIGITAL SIGNALS

(75) Inventor: Jack Chaney, Gilroy, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 596 days.

This patent is subject to a terminal disclaimer.

(21) Appl. No.: 10/856,172

(22) Filed: May 27, 2004

(65) Prior Publication Data

US 2004/0218906 A1  Nov. 4, 2004

Related U.S. Application Data

(62) Division of application No. 09/226,577, filed on Jan. 7, 1999.

(60) Provisional application No. 60/070,764, filed on Jan. 8, 1998.

(51) Int. Cl.
*H04N 7/167* (2006.01)

(52) U.S. Cl. .................. 380/201; 380/205; 380/210; 713/161; 709/232

(58) Field of Classification Search .................. 380/201
See application file for complete search history.

(56) References Cited

U.S. PATENT DOCUMENTS

| | | | |
|---|---|---|---|
| 5,574,787 A | 11/1996 | Ryan | |
| 5,742,685 A | 4/1998 | Berson et al. | |
| 5,799,081 A * | 8/1998 | Kim et al. | 380/203 |
| 5,809,139 A * | 9/1998 | Girod et al. | 380/202 |
| 5,943,422 A | 8/1999 | Van Wie et al. | |
| 6,061,451 A * | 5/2000 | Muratani et al. | 380/201 |
| 6,249,866 B1 | 6/2001 | Brundrett et al. | |
| 6,516,064 B1 * | 2/2003 | Osawa et al. | 380/201 |

FOREIGN PATENT DOCUMENTS

| | | |
|---|---|---|
| EP | 0714204 A | 5/1996 |
| EP | 0717564 A | 6/1996 |
| EP | 0858184 A | 8/1998 |
| FR | 2732537 A | 10/1996 |

(Continued)

OTHER PUBLICATIONS

Schneier, Bruce, Applied Cryptography, 1996, John Wiley & Sons, Inc., pp. 516-517.

(Continued)

*Primary Examiner*—Emmanuel L Moise
*Assistant Examiner*—Shewaye Gelagay
(74) *Attorney, Agent, or Firm*—Kenneth L. Sherman, Esq.; Michael Zarrabian, Esq.; Myers Andras Sherman LLP

(57) ABSTRACT

Embodiments of the present invention provide for the copy protection of distributed material after conditional access is applied, regardless of where the material is distributed. The solutions described provide the advantage of being sufficiently simple in implementation to qualify as "curb high" solutions. "Curb high" solutions provide a range of security from minimal security to a high level of security while requiring relatively fewer system resources to implement than prior approaches.

14 Claims, 4 Drawing Sheets

FOREIGN PATENT DOCUMENTS

| | | |
|---|---|---|
| JP | 08-181689 | 6/1996 |
| JP | 08-181679 | 7/1996 |
| JP | 09-093561 | 4/1997 |
| JP | 09-247616 | 9/1997 |
| JP | 10-145773 A | 8/1998 |
| WO | 0 763 936 A2 | 3/1997 |
| WO | WO 97/43 853 A1 | 10/1997 |
| WO | WO 97/46017 | 12/1997 |
| WO | WO 97/46017 A1 | 12/1997 |
| WO | WO 98/56172 | 12/1998 |

OTHER PUBLICATIONS

Menezes, Handbook of Applied Cryptography, 1997, CRC Press, pp. 11-16, 233-235.

Hartung et al., "Multimedia Watermarking Techniques," Proceedings of the IEEE, Jul. 1999, pp. 1079-1107, vol. 87, No. 7.

EBU Technical Review No. 266, "Functional Model of a Conditional Access System", Dec. 21, 1995, pp. 64-77.

European Search Report, Appliction No. EP 03014763, Nov. 20, 2007.

F. Hartung and B. Girod, "Fast Public-Key Watermarking of Compressed Video", Proceedings IEEE International Conference on Image Processing (ICIP 97), Santa Barbara, CA, USA, Oct. 1997.

U.S. Office Action for U.S. Appl. No. 10/856,894 mailed on Mar. 13, 2009 by Examiner Gelagay, Shewaye.

U.S. Office Action for U.S. Appl. No. 09/226,577 mailed on Mar. 17, 2009 by Examiner Callahan, Paul E.

* cited by examiner

US 7,548,619 B2

SYSTEM AND METHOD FOR COPY PROTECTION FOR DIGITAL SIGNALS

1. RELATED APPLICATION

This application is a divisional patent application of U.S. application Ser. No. 09/226,577 filed Jan. 7, 1999, which application, as well as this application in turn, claims the benefit of priority under 35 U.S.C. 120 of U.S. Provisional Patent Application Ser. No. 60/070,764 filed Jan. 8, 1998.

2. FIELD OF THE INVENTION

The present invention relates to copy protection of consumer electronics media, and more particularly to methods and arrangements for providing copy protection for audio-visual signals used in consumer electronics.

3. DESCRIPTION OF THE RELATED ART

The proliferation of digital technology in consumer electronics has provided a plethora of digital consumer technology products that provide superior performance relative to their analog predecessors. However, the distribution of audio-visual information in digital format coupled with the availability of digital recording devices raises concerns about the piracy of digital audio-visual products, particularly in the entertainment industry. In response to this concern, the MPAA (Motion Picture Association of America) has proposed copy protecting motion pictures released on Digital Video Disk (DVD) to prevent a purchaser from purchasing a single copy and making and distributing multiple copies.

However, these concerns are not limited to audio-visual information released on DVD. Similar concerns exist for other media, for example, cable television and broadcast television among others.

Cable television distributors are concerned about protecting their transmissions, One approach has been to use conditional access to control the distribution of their transmission. Conditional access refers to controlling the distribution of information at user locations. An important difference between using conditional access and copy protection to control the distribution of material is that conditional access applies to particular distribution sites or nodes, while copy protection continues beyond the distribution sites or nodes.

Another approach for protecting audio-visual information has been to encrypt an audio-visual signal and add the capability for receivers to decrypt the audio-visual signal. One problem with this approach is that the receivers often require complex functionality to perform the decrypting, for example in the case of public/private key encryption/decryption.

Another proposal for copy protection of media has been provided by the Copy Protection Working Group (CPTWG) data transmission discussion group (DTDG) sub-committee for copy protection of Section 1394 technology. Section 1394 technology refers to a 100 Mbit/sec or 400 Mbit/sec bus protocol commonly applicable to consumer electronics.

Another proposal is being developed by the National Renewable Security Standards Committee (NRSSC) # an interim standard of EIA (Electronics Industry Associates) security (IS679) that defines two interfaces for removable condition access security. These include what are referred to as a "smart card" and a PCMCIA card.

FIG. 1 illustrates a conventional arrangement 100 for copy protecting an audio-visual signal using a replaceable security module that is coupled to a receiver via an IS679 interface. One or more audio-visual signals, identified as $AVS_1$, through $AVS_N$, are provided to a transmitter 102, typically at rates in the range of 6 Mbits/sec to 100 Mbits/sec. Audio-visual signals $AVS_1$, $AVS_2$ through $AVS_N$, are encoded by encoders $E_1$, $E_2$ through $E_N$ respectively, using for example, MPEG encoding techniques, and separated into audio signals $AS_1$, through $AS_N$ and video signals $VS_1$, $VS_2$ through $VS_N$.

Audio signals $AS_1$, $AS_2$ through $AS_N$ and video signals $VS_1$, $VS_2$ through $VS_N$ are then encrypted by scramblers $S_1$, $S_2$, through $S_N$ respectively, using for example, any number of widely available key encryption techniques. The encrypted audio signals $AS_1$, $AS_2$ through $AS_N$ and video signals $VS_1$, $VS_2$ through $VS_N$ are then combined by a combiner 104 into a single audio-visual signals. Combiner 104 may include several processes such as multiplexers and other processors necessary to provide the single audio-visual signal.

The single audio-visual signal is then provided to a receiver 106 via a link 108. Link 108 can include one or more communication mediums and/or systems and supporting apparatuses that are configured to carry the single audio-visual signal between transmitter 102 and receiver 106. Examples of link 108 include, but are not limited to, a telephone system, a cable television system, a broadcast television system (direct or indirect), a satellite broadcast system (direct or indirect), one or more computer networks and/or buses, the Internet, an intranet, and any software, hardware and other communication systems and equipment associated therewith for transmitting encoded data between two locations.

After receiving the single audio-visual signal, receiver 106 transmits the audio-visual signal to a replaceable security module 110 via an interface 112. For IS679 applications, replaceable security module 110 is a smart card or a PCMCIA card that is communicatively coupled to receiver 106 via an IS679 compatible interface 112. However, other types of interfaces may also be used to couple replaceable security module 110 to receiver 106. Replaceable security module 110 includes a de-scrambles 114 that removes the encryption placed into the encoded audio signals $AS_1$, $AS_2$ through $AS_N$ and video signals $VS_1$, $VS_2$ through $VS_N$ by scramblers $S_1$, $S_2$ through $S_N$. The de-scrambled single audio-visual signal is then returned to receiver 106 and decoded with a decoder 116 contained in receiver 106. The de-scrambled and decoded audio-visual signal is then provided to a display 118 to be displayed or otherwise viewed.

One of the advantages of using this approach is that all of the de-scrambling operations are performed in replaceable security module 110. This allows manufacturers to provide standard receivers without specialized de-scrambling. For IS679 applications, the replaceable security modules may be in the form of a smart card or a PCMCIA card, providing "personalized" security.

Despite the advantages of this approach, it is not without its own disadvantages and limitations. One disadvantage to this approach is that in situations where interface 112 is accessible, the de-scrambled audio-visual signals can be redistributed to other locations and then decoded and displayed, circumventing the copy protection. For example, in the case of a DVD player that uses a replaceable security module as illustrated in FIG. 1, if interface 112 can be accessed, then the de-scrambled (unprotected) audio-visual signal can be distributed to multiple receivers and display devices and even recorded and redistributed.

Based upon the need to provide copy protection of audio-visual signals in IS679 application and the limitations in the prior approaches, an approach for providing copy protection of audio-visual signals IS679 applications that avoids the problems associated with the prior approaches is highly desireable.

SUMMARY OF THE INVENTION

In general, embodiments of the present invention provide for the copy protection of distributed material after conditional access is applied, regardless of where the material is distributed. The solutions described herein provide the advantage of being sufficiently simple in implementation to qualify what is known in the art as "curb high" solutions. "Curb high" solutions provide a range of security from minimal security to a high level of security while requiring relatively fewer system resources to implement than prior approaches.

The method of the preferred embodiment of the present invention for copy protecting a digital signal representing audio-visual information, comprises the steps of: (a) encoding the digital signal to obtain an encoded signal; (b) converting the encoded signal into a copy protected signal using a copy protection function, wherein the function utilizes a data signal representing copy protection data; and (c) scrambling the copy protected signal to obtain a scrambled signal.

The system of the preferred embodiment of the present invention for recovering an audiovisual signal from a digital signal including a scrambled signal and a copy protection data signal representing copy protection data, comprises a receiver and a descrambler module interconnected via a link.

The descrambler module includes:
(1) a first communication interface for communicating with the receiver via the link; and
(2) a descrambler for descrambling an incoming scrambled signal from the receiver via the link.

The receiver includes:
(1) a second communication interface for communicating with the descrambler module via the link,
(2) a processor for: (i) removing said data signal from the digital signal, and storing the copy protection data represented by the data signal in a memory device, (ii) extracting said scrambled signal from the digital signal, and providing the scrambled signal to the descrambler via the link; and
(3) a reconverter for converting an incoming copy protected signal from the descrambler back into said audio-visual signal using an inverse copy protection function, wherein the inverse function utilizes said stored copy protection data.

In this preferred embodiment of the present invention, the signals flowing from the descrambler module to the receiver via the link are protected against copying.

BRIEF DESCRIPTION OF THE DRAWINGS

The above and other features, organizations, advantages and objects of the present invention, which are believed to be novel, are set forth with particularity in the appended claims, The present invention, both as to its organization and manner of operation, together with further objects and advantages, will be fully understood from the following detailed description and the accompanying drawings. Each of the drawings contained herein are not considered to be accurate depictions of the embodiments of the invention, but are provided for illustrative purposes only and are to be interpreted in conjunction with the attached specification.

DETAILED DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

Figure 2:
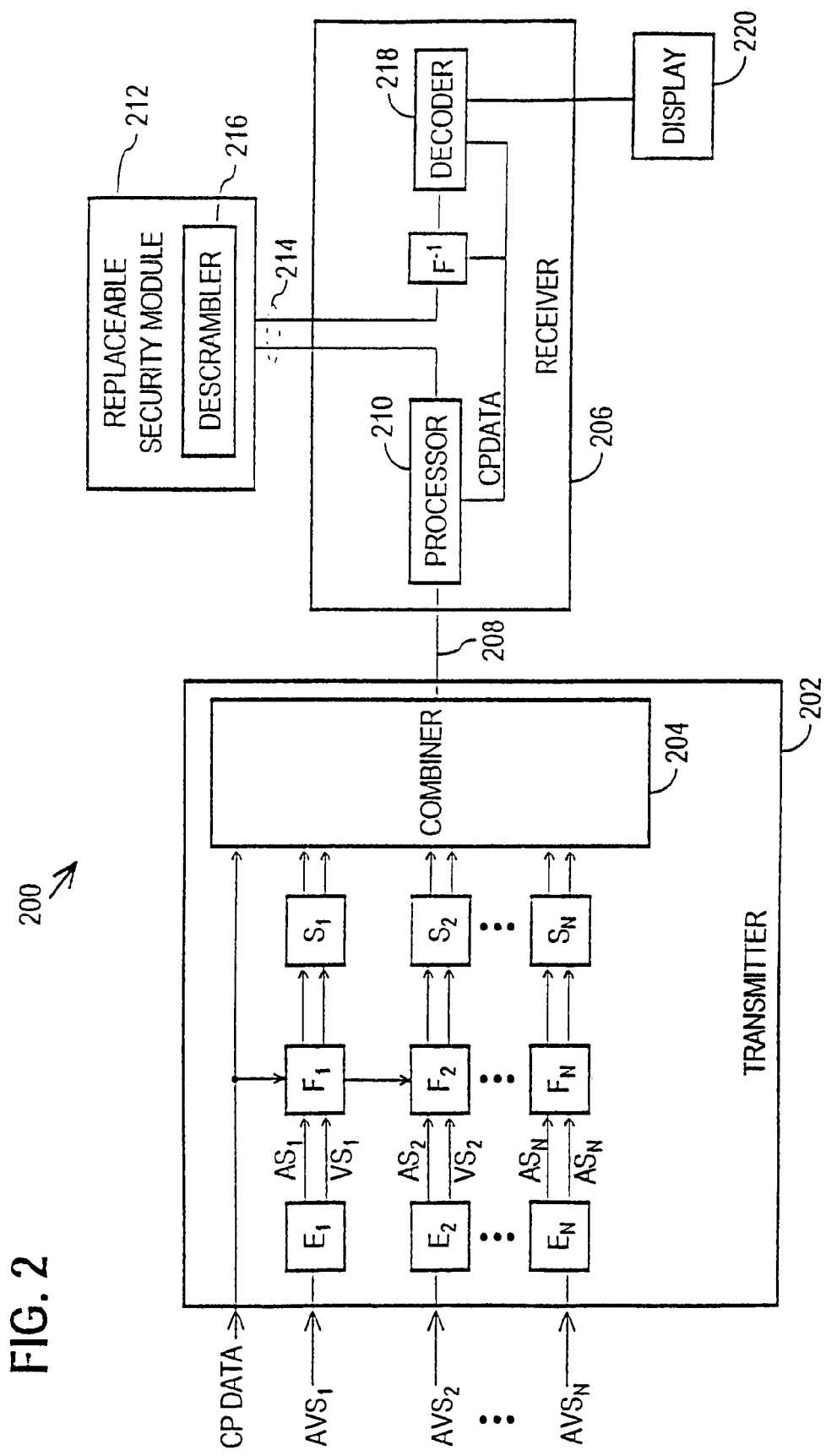
FIG. 2 illustrates an arrangement for copy protecting audio-visual signals using a replaceable security module according to a preferred embodiment of the present invention.

FIG. 2 illustrates an arrangement 200 for copy protecting audio-visual signals using a replaceable security module according to a preferred embodiment of the present invention. One or more audio-visual signals, identified as $AVS_1$, $AVS_S$ through $AVS_N$ are provided to a transmitter 202, typically at rates in the range of 6 Mbits/sec to 100 Mbits/sec. Audio-visual signals $AVS_1$, $AVS_2$ through $AVS_N$ are encoded by encoders $E_1$, $E_2$ through $E_N$ respectively contained in transmitter 202, using, for example, MPEG encoding techniques, and separated into audio signals $AS_1$, $AS_2$ through $AS_1$ and video signals $VS_1$, $VS_2$ through $VS_N$.

A function is applied to audio signals $AS_1$, $AS_2$ through $AS_N$ and video signals $VS_1$, $VS_2$ through $VS_N$ by function modules, $F_1$, $F_2$ through $F_N$ respectively to add copy protection. Copy protection data CP DATA is provided to transmitter 202 and used by function modules $F_1$, $F_2$ through $F_N$ to apply the function to audio signal $AS_1$, $AS_2$ through $AS_1$ and video signals $VS_1$, $VS_2$ through $VS_N$.

After being processed by function modules $F_1$, $F_2$ through $F_N$, audio signals $AS_1$, $AS_2$ through $AS_N$ and video signals $VS_1$, $VS_2$ through $VS_N$ are encrypted by scramblers $S_1$, $S_2$ through $S_N$ respectively using for example, any number of widely available key encryption techniques and copy of protection data CP DATA. Encryption information required by scramblers $S_1$, $S_2$ through $S_N$, such as for example, encryption key information, is provided by a conditional access management system (not illustrated) that is typically included in transmitter 202, but may reside elsewhere.

The encrypted audio signals $AS_1$, $AS_2$ through $AS_N$, video signals $VS_1$, $VS_2$ through $VS_N$ and copy protection data CP DATA are then combined by a combiner 204 to provide a single audio-visual signal. Thus, the copy protection data CP DATA is included in the single audio-visual signal. Combiner 204 may include several processors, such as multiplexers and other processors, necessary to provide the single audio-visual signal.

Figure 1:
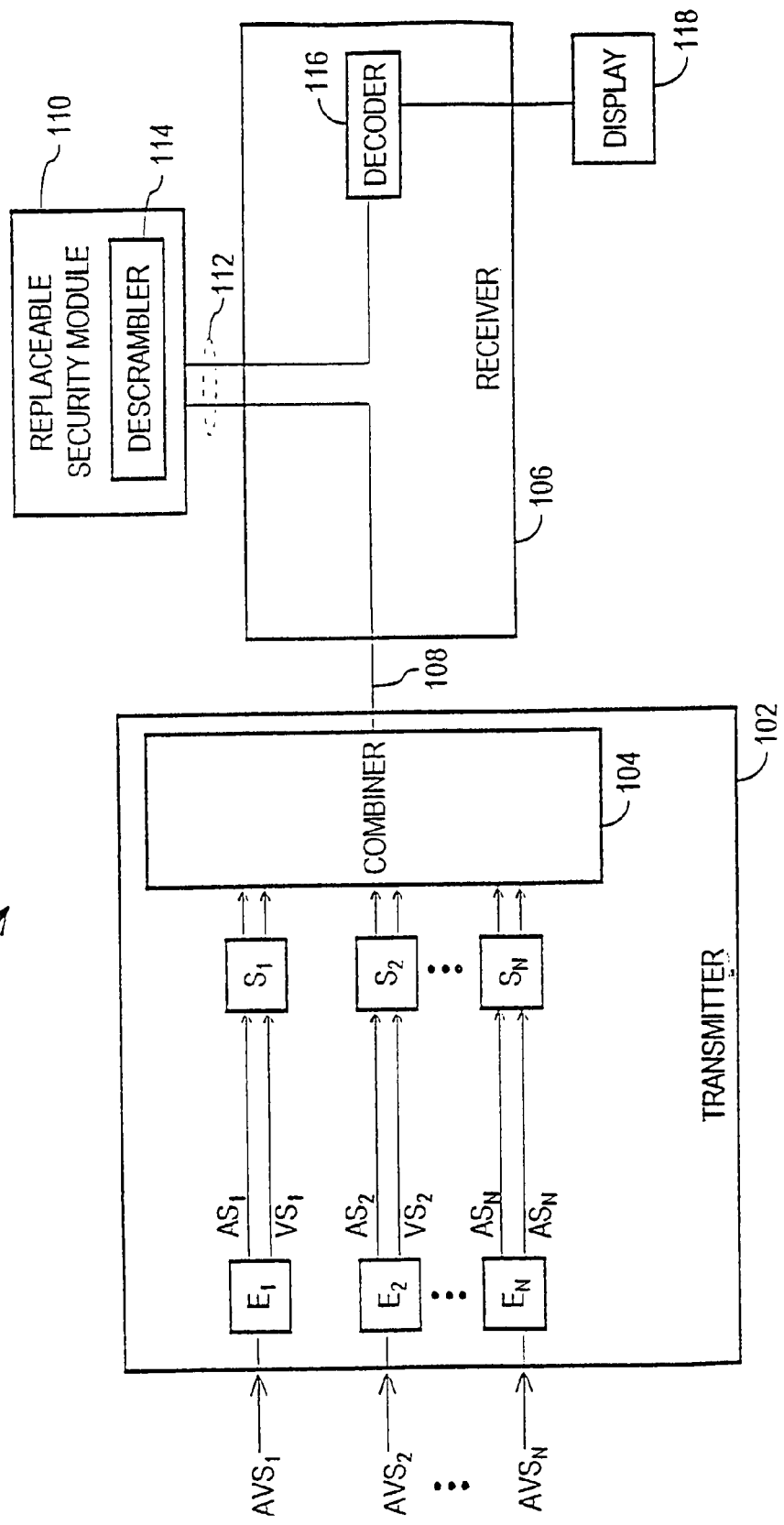
FIG. 1 illustrates a conventional arrangement for copy protecting an audio-visual signal using a replaceable security module that is coupled to a receiver via an IS679 interface.

The single audio-visual signal is then provided to a receiver 206 via a link 208. As with link 108 of FIG. 1, link 208 can include one or more communication mediums or systems, or both, and supporting apparatuses that are configured to carry the single audio-visual signal between transmitter 202 and receiver 206. Examples of link 208 include, but are not limited to, a telephone system, a cable television system, a broadcast television system (direct or indirect), a satellite broadcast system (direct or indirect), one or more computer networks and/or buses, the Internet, an intranet, and any software, hardware and other communication systems and equipment associated therewith for transmitting encoded data between two locations, When receiver 206 receives the audio-visual signal via link 208, the copy protection data CP DATA is removed from the audio-visual signal by processor 210. For applications where the audio-visual signal on link 208 is formatted in packets, processor 210 extracts one or more data packets containing the copy protection data CP DATA from the audio-visual signal and replaces them with data packets containing predetermined data, such as NULL values. For example, data packets containing copy protection data CP DATA may have a predetermined data packet identification, so that they can be easily identified by processor 210.

Then the single audio-visual signal is provided to a replaceable security module 212 via an interface 214. For IS679 applications, replaceable security module 212 is a smart card or a PCMCIA card that is communicatively coupled to receiver 206 via an IS679 compatible interface 214. Replaceable security module 212 includes a de-scrambler 216 that removes the encryption placed into the encoded audio signals $AS_1$, $AS_2$ through $AS_N$ and video signals $VS_1$, $VS_2$ through $VS_N$ by scramblers $S_1$, $S_2$ through $S_N$.

The de-scrambled single audio-visual signal is then returned to receiver 206 via interface 214. Thus, the de-scrambled audio-visual signal received by receiver 206 from replaceable security module 212 does not contain the encryption provided by scramblers $S_1$, $S_2$ through $S_N$ but does still contain the copy protection applied by function modules $F_1$, $F_2$ through $F_N$.

The de-scrambled audio-visual signal is then provided to function block $F^{-1}$ that applies an inverse function to $F^{-1}$ to remove the copy protection applied by function modules $F_1$, $F_2$ through $F_N$ using the copy protection data CP DATA that was extracted from the audio-visual signal by processor 210. According to the preferred embodiment of the present invention, function block $F^{-1}$ bases the application of the inverse function $F^{-1}$ to the de-scrambled audio-visual signal on the presence of data packets containing the predetermined value. For example, when function block $F^{-1}$ identifies a data packet that contains the predetermined value, the new copy protection data CP DATA retained by receiver 206 is used by function block $F^{-1}$ to apply the inverse function $F^{-1}$ to the subsequent data packets until the next data packet containing the predetermined value is identified.

The de-scrambled audio-visual signal is then decoded by a decoder 218 contained in receiver 106. The de-scrambled and decoded audio-visual signal is then provided to a display 220 to be displayed or otherwise viewed.

This approach of the preferred embodiment of the present invention provides several important advantages over prior approaches for providing copy protection of audio-signal. First, this approach provides a higher level of security than the prior art approach described with reference to FIG. 1, because the de-scrambled signal provided by replaceable security module 212 contains the copy protection provided by function modules $F_1$, $F_2$ through $F_N$, but does not contain the copy protection data CP DATA, which was removed by processor 210. Once removed from the audio-visual signal, the copy protection data CP DATA is maintained internally in receiver 206. Thus, the de-scrambled signal provided by replaceable security module 212 cannot be used by other receivers and/or recording devices, even those that contain a function block equivalent to function block $F^{-1}$ because they will not have access to copy protection data CP DATA, which can be periodically changed.

In addition, this copy protection approach is very flexible and allows receiver manufacturers to continue a standard design without special components or algorithms, since processor 210 and function block $F^{-1}$ may be implemented as standard components. The copy protection functionality, including the level of copy protection, is defined by the copy protection data CP DATA provided to transmitter 202.

Thus, function modules $F_1$, $F_2$ through $F_N$ may perform a relatively simple function, such as an exclusive OR logical operation (XOR). The advantage of using a simple function is that relatively fewer system resources are required to implement the F and $F^{-1}$ functions compared to conventional approaches that use sophisticated encryption algorithms. However, more exotic functions may be used depending upon the level of copy protection desired for a particular application. In the context of MPEG2 encoding, a single packet of 184 bytes of data may be used to perform an XOR function of 64 to 1000 bits. Moreover, the copy protection data CP DATA may be changed as frequently as needed upon the requirements of a particular application.

Figure 3:
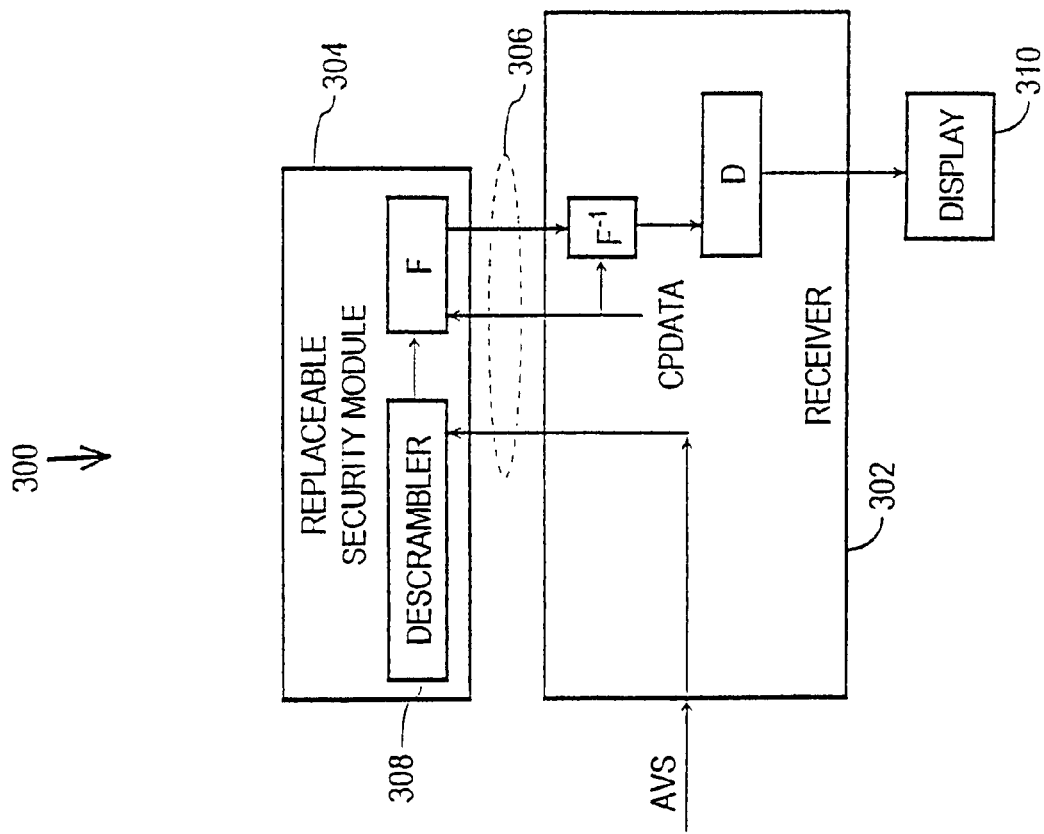
FIG. 3 is a block diagram of an arrangement that illustrates a second preferred embodiment of the present invention.

According to a second preferred embodiment of the present invention, the copy protection data CP DATA is not included in the audio-visual signal, but instead is generated internally by the receiver and provided to the replaceable security module. FIG. 3 is a block diagram of an arrangement 300 that illustrates this approach. A receiver 302 receives an audio-visual signal (AVS) that is provided to a replaceable security module 304 via an IS679 interface 306.

Replaceable security module includes a de-scrambler 308 for de-scrambling the AVS signal. The AVS is then provided to a function module F that copy protects the AVS by applying a function to AVS using copy protection data to generate a processed AVS. The CP DATA is randomly generated by receiver 302 and provided to replaceable security module 302.

The processed AVS is provided back to receiver 302 via interface 306 where a function module $F^{-1}$ applies a function using the copy protection data CP DATA to remove the copy protection previously applied by function module F. The AVS data is then decoded by a decoder D and provided to display 310 to be displayed or otherwise viewed. This approach avoids having to include the copy protection data CP DATA in the AVS. Since the copy protection data CP DATA can be randomly generated, the use of specialized components or algorithms in receiver 302 is still avoided.

Although embodiments of the invention have been described herein in the context of providing copy protection for the IS679 interface application, the approaches described herein are applicable to other audio-visual arrangements. In addition, the approaches described herein are applicable to other types of signals and information besides audio-visual signals.

Figure 4:
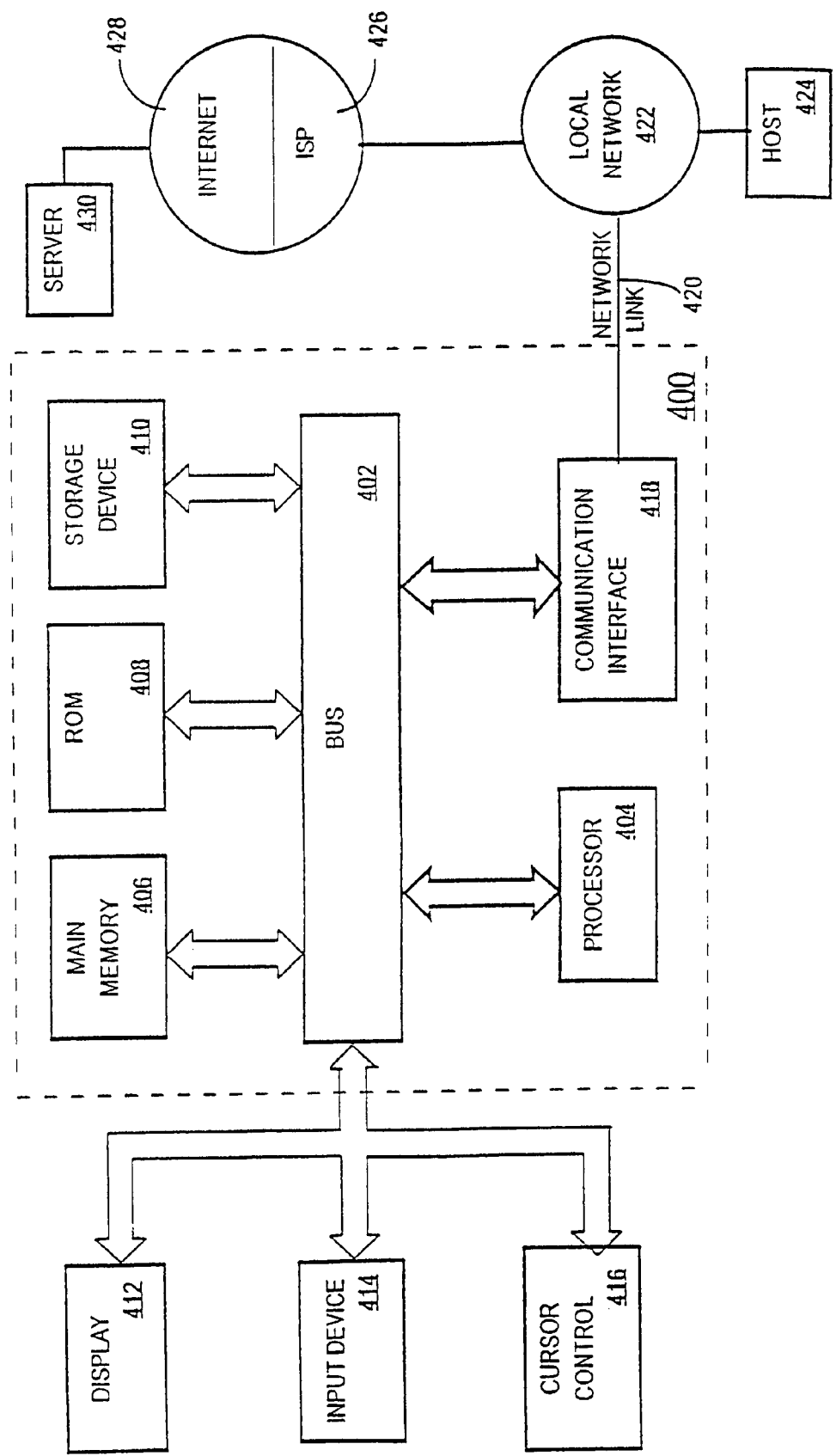
FIG. 4 is a block diagram that illustrates a computer system upon which a preferred embodiment of the invention may be implemented.

The various components described above may be implemented as discrete hardware components, one or more software processes, or a combination of discrete hardware components and on or more software processes. In this regard, FIG. 4 is a block diagram that illustrates a computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 to storing information and instructions to be executed by processor 404. Main memory 406 also may be used for storing temporary variables or other intermediate information during execution of instructions to be executed by processor 404.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled a via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The embodiments of the present invention are related to the use of computer systems 400 for providing copy protection of audio-visual signals in IS679 applications. According to one preferred embodiment of the invention, the copy protection of audio-visual signals in IS679 applications is provided by computer system 400 in response to processor 404 executing one or more sequences of one or more instructions contained in memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the embodiments of the present invention. Thus, embodiments of the present invention are not limited to any specific combination of hardware circuitry and software.

The term "Computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the date on bus 402. Bus 402 carries the data main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer systems 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for providing copy protection of audio-visual signals in IS679 applications as described herein.

The received code may be executed by processor 404 as it is received, and/or stored in storage device 410, or other non-volatile storage for later execution. In this matter, computer systems 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a copy protection system including a receiver interconnected to a descrambler module via a link, a method of copy protecting signals flowing from the descrambler module to the receiver via a link, comprising the steps of:
   (a) receiving a digital signal in the receiver, said digital signal including a scrambled signal;
   (b) generating a copy protection data signal at the receiver by utilizing a scheme which uses random number generation;
   (c) transmitting said digital signal from the receiver to the descrambler module via the link;

(d) descrambling said scrambled signal in the descrambler module to obtain a descrambled signal;
(e) converting said descrambled signal in the descrambler module into a copy protected signal using the copy protection data signal;
(f) transmitting said copy protected signal from the descrambler to the receiver via the link; and
(g) reconverting said copy protected signal to the descrambled signal by a function module in the receiver using said copy protection data signal, wherein use of the digital signal is prevented without access to the copy protection data signal, and wherein the copy protected signal can still be copied even without the copy protection data, but that copy cannot be used without the copy protection data signal.

2. The method of claim 1, wherein the step (b) of generating said copy protection data signal includes generating the copy protection data signal in the receiver.

3. The method of claim 2, further comprising the step of transmitting said copy protection data signal from the receiver to the descrambler module via the link.

4. The method of claim 1, wherein said digital signal in step (a) is encoded and scrambled.

5. The method of claim 1, wherein the descrambler module comprises a PCMCIA card.

6. The method of claim 1, wherein the link comprises one or more communication mediums configured for carrying digital signals.

7. The method of claim 1, wherein the receiver and the descrambler module utilize IS679 compatible interfaces for communication via the link.

8. The method of claim 1, further comprising the step of decoding the descrambled signal in the receiver after the step of reconverting.

9. A method of copy protecting signals flowing through an interface between a descrambler module and a receiver, comprising:
receiving a digital signal at the receiver from a transmitter, the digital signal including a scrambled signal;
generating a copy protection data signal at the receiver by utilizing a scheme that uses random number generation;
transmitting the digital signal from the receiver to the descrambler module via the interface;
descrambling the scrambled signal in the descrambler module to obtain a descrambled signal;
converting the descrambled signal in the descrambler module into a copy protected signal using the copy protection data signal;
transmitting the copy protected signal from the descrambler to the receiver via the link; and
reconverting the copy protected signal to the descrambled signal by a function module in the receiver using said copy protection data signal,
wherein use of the digital signal is prevented without access to the copy protection data signal, and wherein the copy protected signal can still be copied even without the copy protection data, but that copy cannot be used without the copy protection data signal.

10. The method of claim 9, wherein the digital signal is received by the receiver transmitted from the transmitter through a link, and wherein the copy protection data signal is generated at one of the receiver and the transmitter.

11. The method of claim 10, wherein the descrambler module is a replaceable module removably coupled to the receiver through the interface.

12. A system of copy protecting signals flowing through an interface between a descrambler module and a receiver, comprising:
means receiving a digital signal at the receiver from a transmitter, the digital signal including a scrambled signal;
means for generating a copy protection data signal at the receiver by utilizing a scheme that uses random number generation;
means for transmitting the digital signal from the receiver to the descrambler module via the interface;
means for descrambling the scrambled signal in the descrambler module to obtain a descrambled signal;
means for converting the descrambled signal in the descrambler module into a copy protected signal using a copy protection data signal;
means for transmitting the copy protected signal from the descrambler to the receiver via the link; and
means for reconverting the copy protected signal to the descrambled signal by a function module in the receiver using said copy protection data signal,
wherein use of the digital signal is prevented without access to the copy protection data signal, and wherein the copy protected signal can still be copied even without the copy protection data, but that copy cannot be used without the copy protection data signal.

13. The system of claim 12, wherein the digital signal is received by the receiver transmitted from the transmitter through a link, and wherein the copy protection data signal is generated at one of the receiver and the transmitter.

14. The method of claim 13, wherein the descrambler module is a replaceable module removably coupled to the receiver through the interface.

* * * * *